(12) United States Patent
van Osselaer et al.

(10) Patent No.: US 6,710,154 B2
(45) Date of Patent: Mar. 23, 2004

(54) POLYCARBONATE SUBSTRATES

(75) Inventors: Tony van Osselaer, Krefeld (DE);
Steffen Kühling, Meerbusch (DE);
Paul Viroux, Hove (BE); Hugo Plompen, Stabroek (BE); Richard Vansant, Vremde (BE)

(73) Assignee: Bayer Aktiengesellschaft, Leverkusen (DE)

( * ) Notice: Subject to any disclaimer, the term of this patent is extended or adjusted under 35 U.S.C. 154(b) by 6 days.

(21) Appl. No.: 10/169,883

(22) PCT Filed: Jan. 3, 2001

(86) PCT No.: PCT/EP01/00014
§ 371 (c)(1),
(2), (4) Date: Jul. 10, 2002

(87) PCT Pub. No.: WO01/51541
PCT Pub. Date: Jul. 19, 2001

(65) Prior Publication Data
US 2003/0004297 A1 Jan. 2, 2003

(30) Foreign Application Priority Data
Jan. 13, 2000 (DE) .......................... 100 01 036

(51) Int. Cl.$^7$ .............................. G08G 64/00
(52) U.S. Cl. .................. 528/196; 359/109; 369/47; 369/59.11; 369/59.24; 428/64.7; 528/198
(58) Field of Search .................. 359/109; 369/47, 369/59.1, 59.2, 59.11, 59.24; 428/4.7, 64.7; 528/196, 198, 481, 125

(56) References Cited

U.S. PATENT DOCUMENTS 5,086,159 A * 2/1992 Fritsch et al. ............... 528/204

FOREIGN PATENT DOCUMENTS

EP     0 691 361     1/1996

OTHER PUBLICATIONS

*Database WPI Section Ch, Week 199935 Derwent Publications Ltd., London, GB; Class A23, AN 1999–412383 XP002168866 & JP 11 165342 A(Teijin Kasei Ltd), Jun. 22, 1999 Zusammenfassung, Copies of documents previously submitted by WIPO.
*Database WPI Section Ch, Week 199737 Derwent Publications Ltd., London, GB; Class A23, AN 1997–399751 XP002168867 & JP 09 176477 A (Teijin Kasei Ltd), Jul. 8, 1997 Zusammenfassung, Copies of documents previously submitted by WIPO.

* cited by examiner

Primary Examiner—Terressa Boykin
(74) Attorney, Agent, or Firm—Joseph C. Gil; Aron Preis; Gary F. Matz

(57) ABSTRACT

A method for producing polycarbonate based on 1,1-bis(4-hydroxyphenyl)-3,3,5-trimethyl cyclohexanone and 4,4-(metaphenylene diisopropyl) diphenol is disclosed. The method is characterized in that the recovery and/or further processing of the polycarbonate is performed at temperatures below 290° C. The polycarbonate thus produced has high purity and high transmission and is suitable for the manufacture of optical data stores.

7 Claims, No Drawings

POLYCARBONATE SUBSTRATES

The application concerns a method for the production of polycarbonates having high purity and extremely high transmission, particularly with short wavelengths, based on 1,1-bis(4-hydroxyphenyl)-3,3,5-trimethyl cyclohexanone and 4,4-(metaphenylene diisopropyl)diphenol, and use of the polycarbonate thus obtained for the manufacture of optical data stores, and optical data stores manufactured in this way.

Highly pure polycarbonate is required for optical data carriers as the polycarbonate is located in the optical radiation path of the laser and the information structures stored in the polycarbonate exhibit orders of magnitude in the micrometre or submicrometre range. Furthermore, there is a trend towards refining information structures even further—to create more information density—and then to use lasers with shorter wavelengths, e.g. those emitting blue light (<420 nm). The object was therefore to develop data carriers or methods for the manufacture of data carriers that demonstrate elevated transmission in the short-wave light range.

As a further precondition for obtaining high storage densities, the polycarbonate used must have a low refractive index. Such a polycarbonate has previously been described in EP-A-691 361, which refers to the importance of a high light transmission in the polycarbonate. However, this is expressed only as an integrated quantity across the entire wavelength range as >85%. This integrated quantity conveys nothing about the transmission in the significant short-wave range (390 nm to 450 nm), however.

Polycarbonates are generally produced by means of a method known as the phase boundary method, whereby dihydroxydiaryl alkanes in the form of their alkali salts are reacted with phosgene in the heterogeneous phase in the presence of inorganic bases such as caustic soda solution and an organic solvent, in which the product polycarbonate is readily soluble. During the reaction the aqueous phase is emulsified in the organic phase, forming droplets of various sizes. After the reaction the organic phase containing the polycarbonate is conventionally washed several times with an aqueous liquid and separated from the aqueous phase as thoroughly as possible after each washing process.

Aqueous liquids such as dilute mineral acid, particularly HCl or $H_3PO_4$, are used as washing liquids to separate off the catalyst, whereby the concentration of HCl or $H_3PO_4$ in the washing liquid is 0.5 to 1.0 wt. %, for example, and demineralised, ultra-finely filtered, low-metal water is used for further cleaning.

Separating vessels, phase separators, centrifuges or coalescers known per se, or combinations of these devices, are used as phase separation devices to separate off the washing liquid.

The polycarbonate is generally removed by evaporating off the solvent at reduced pressure and elevated temperature, or by spray drying. The polycarbonate then accumulates as a powder. The polycarbonate can also be obtained by precipitation out of the organic solution followed by residual drying. Another possibility for evaporation and removal of the (residual) solvent is extrusion, whilst extrusion evaporator technology represents a further alternative.

The object of the present invention is the provision of an improved method for the production of pure polycarbonate that is highly transparent even under short-wave light.

Surprisingly it has now been found that the light transmission of polycarbonate is directly related to the final production stage—removal and evaporation of the solvent—and to further processing. In particular it has been found that the temperature in these process stages has a critical influence on the light transmission property of the polycarbonate with short wavelengths.

The application therefore provides a method for the production and further processing of polycarbonate based on 1,1-bis(4-hydroxyphenyl)-3,3,5-trimethyl cyclohexanone and 4,4-(metaphenylene diisopropyl)diphenol, characterised in that the polycarbonate is recovered and/or processed further at temperatures of no more than 290° C., preferably no more than 285° C., particularly preferably at temperatures of 240 to particularly no more than 280° C.

The polycarbonate can be produced according to generally known methods. The polycarbonate is preferably produced by means of the phase boundary method, whereby the temperatures according to the invention should not be exceeded in the solvent separation stage nor in any optional subsequent process stages.

In a preferred embodiment, directly after the polycarbonate production reaction, the reaction mixture is filtered and/or the organic polycarbonate phase that has been obtained and separated off is filtered and optionally washed and/or the organic polycarbonate phase separated from the washing liquid is optionally hot-filtered.

Preferably at least two of these filtration process are performed, and in particular all three.

In a preferred variant, especially in the case of hot filtration, the filtration process is performed at least once, preferably twice, particularly preferably at least three times and in particular on a stepwise basis. Stepwise filtration begins with coarser filters and then switches to finer filters. Two-phase media are preferably filtered during the process stage with coarser filters.

In the process stage filters with a small pore size are used for hot filtration. It is important for this that the polycarbonate phase is as homogeneous a solution as possible. This is achieved by heating the organic polycarbonate phase, which generally still contains residues of aqueous washing liquid. The washing liquid is dissolved in the organic solvent and a clear solution formed. The previously dissolved impurities, particularly the dissolved alkali salts, are precipitated out and can be filtered off.

The known freeze-thaw method may also be used in addition to the method described above in order to obtain a homogeneous solution.

Membrane filters and sintered metal filters or bag filters are used as filters to perform the filtration according to the invention. The pore size of the filters is generally 0.05 to 5 $\mu$m, preferably 0.05 to 1.5 $\mu$m, particularly around 0.2 $\mu$m, 0.6 $\mu$m or around 1.0 $\mu$m. Such filters are available commercially, e.g. from Pall GmbH, D-63363 Dreieich, and Krebsboge GmbH, D-42477 Radevormwald (model SIKA-R CU1AS).

Examples of inert organic solvents used in the process are dichloromethane, the various dichloroethanes and chloropropane compounds, chlorobenzene and chlorotoluene; dichloromethane and mixtures of dichloromethane and chlorobenzene are preferably used.

The reaction can be accelerated with catalysts such as tertiary amines, N-alkyl piperidines or onium salts. Tributylamine, triethylamine and N-ethyl piperidine are preferably used. A monofunctional phenol, such as phenol, cumyl phenol, p-tert-butyl phenol or 4-(1,1,3,3-tetramethylbutyl)phenol, can be used as chain terminator and molecular weight regulator. Isatin bis-cresol, for example, can be used as branching agent.

To produce the highly pure polycarbonates the bisphenols are dissolved in the aqueous alkaline phase, preferably caustic soda solution. The chain terminators optionally required to produce copolycarbonates are dissolved in the aqueous alkaline phase in quantities of 1.0 to 20.0 mol % per mol of bisphenol, or are added to it in bulk in an inert organic phase. Phosgene is then introduced into the mixer containing the other reaction components and the polymerisation is performed.

1,1-bis(4-hydroxyphenyl)-3,3,5-trimethyl cyclohexanone and 4,4-(metaphenylene diisopropyl)diphenol (Bisphenol M) and optionally mixtures thereof are used as bisphenols, whereby the 1,1-bis(4-hydroxyphenyl)-3,3,5-trimethyl cyclohexanone is always present in quantities >0.1 mol %. Preferred 1,1-bis(4-hydroxyphenyl)-3,3,5-trimethyl cyclohexanone concentrations are between 40 and 60 mol %. The bisphenol concentrations to be used according to the invention are reacted with carbonic acid components, particularly phosgene.

Optionally used chain terminators include both monophenols and monocarboxylic acids. Suitable monophenols include phenol itself, alkyl phenols such as cresols, p-tert-butyl phenol, p-cumyl phenol, p-n-octyl phenol, p-isooctyl phenol, p-n-nonyl phenol and p-isononyl phenol, halophenols such as p-chlorophenol, 2,4-dichlorophenol, p-bromophenol and 2,4,6-tribromophenol and mixtures thereof.

Suitable monocarboxylic acids are benzoic acids, alkyl benzoic acids and halobenzoic acids.

Preferred chain terminators are phenols with the formula (I)

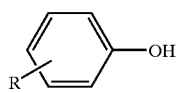

(I), where
R is hydrogen, tert-butyl or a branched or unbranched $C_8$ and/or $C_9$ alkyl radical.

The preferred chain terminator is phenol and p-tert-butyl phenol.

The quantity of chain terminator to be used is 0.1 mol % to 5 mol %, relative to moles of diphenols used in each case. The chain terminator may be added before, during or after phosgenation.

Branching agents may optionally also be added to the reaction. Preferred branching agents are trifunctional or higher than trifunctional compounds known in polycarbonate chemistry, particularly those having three or more than three phenolic OH groups.

Examples of preferred branching agents also include phloroglucinol, 4,6-dimethyl-2,4,6-tri(4-hydroxyphenyl) heptene-2,4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenyl methane, 2,2-bis[4,4-bis(4-hydroxyphenyl)cyclohexyl] propane, 2,4-bis(4-hydroxyphenyl isopropyl)phenol, 2,6-bis (2-hydroxy-5'-methylbenzyl)-4-methyl phenol, 2-(4-hydroxyphenyl)-2-(2,4-dihydroxyphenyl)propane, hexa-(4-(4-hydroxyphenyl isopropyl)phenyl)orthoterephthalic acid ester, tetra-(4-hydroxyphenyl)methane, tetra-(4-(4-hydroxyphenyl isopropyl)phenoxy)methane and 1,4-bis(4', 4"-dihydroxytriphenyl)methyl)benzene as well as 2,4-dihydroxy benzoic acid, trimesic acid, cyanuric chloride and 3,3-bis(3-methyl-4-hydroxyphenyl)-2-oxo-2,3-dihydroindole.

The quantity of the optionally used branching agent is 0.05 mol % to 2 mol %, again relative to moles of diphenols used in each case.

The branching agents may either be introduced into the aqueous alkaline phase together with the diphenols and the chain terminators or added prior to phosgenation dissolved in an organic solvent.

The polycarbonates according to the invention are copolycarbonates and mixtures thereof. The term polycarbonate is used to represent polycarbonate substrates obtainable by means of the method according to the invention.

The polycarbonates according to the invention have average molecular weights $M_w$ (determined by gel permeation chromatography after prior calibration) of 10,000 to 30,000, preferably 12,000 to 25,000.

The polycarbonate produced by the method according to the invention is characterised by a transmission of over 86%, particularly over 88%, with a wavelength of 400 nm, in accordance with ASTM E 313 (Standard Practice for Calculating Yellowness and Whiteness Indices from Instrumentally Measured Color Coordinates, American Society for Testing and Materials, 100 Barr Harbor Dr., West Conehohochen, Pa. 19428; Designation E 313-98).

The application thus also provides the polycarbonate obtainable by the method according to the invention, with high purity and particularly high transmission under irradiation with blue laser light.

The application also provides optical data stores that are manufactured substantially from polycarbonate based on 1,1-bis(4-hydroxyphenyl)-3,3,5-trimethyl cyclohexanone and 4,4-(metaphenylene diisopropyl)diphenol characterised by a transmission of over 86%, particularly over 88%, with a wavelength of 400 nm, in accordance with ASTM E 313. Optical data carriers according to the invention are in particular those that are readable, writable or rewritable, whereby a laser beam is used in the reading or writing process. Optical data carriers using a laser beam to write or read in the wavelength range from 390 to 500 nm, particularly preferably 395 to 450 nm, are preferred. The optical data carriers may have one information layer per disk, as in the case of audio CD, DVD5 or magneto-optical writing, such as minidisks, two information layers, as in the case of DVD9, DVD10, or more than two information layers, as in the case of DVD18, for example. The optical data carriers are manufactured by known methods, e.g. by injection moulding or injection-compression moulding of the polycarbonate according to the invention.

The following examples are intended to clarify the invention. The invention is not limited to these examples.

EXAMPLES

Example 1

In order to produce the polycarbonates, 1,1-bis(4-hydroxyphenyl)-3,3,5-trimethyl cyclohexanone and 4,4-(metaphenylene diisopropyl)diphenol (Bisphenol M) are mixed in an aqueous 6.5% NaOH solution with exclusion of oxygen. The NaOH and demineralised water used are filtered. This sodium dibisphenolate solution is then used in the polycarbonate reaction with phosgene (dissolved in chlorobenzene/methylene chloride) and t-butyl phenol as chain terminator. After the reaction the organic reaction solution is filtered and sent to be washed. Here it is washed with 0.6% hydrochloric acid and then washed again with filtered demineralised water a further 5 times. The organic solution is separated from the aqueous solution and then filtered again after being heated to 55° C. The polymer is then gradually released by evaporating the solvent. The final stage of solvent evaporation is performed in an extruder along which a graduated vacuum is applied (the final zone is under high vacuum) and at the same time the temperature of the melt is raised such that the solvent is evaporated off. The melt temperature of the product in the extruder ranges from 240° C. when the polycarbonate solution enters the extruder to 280° C. when it leaves it. The polycarbonate, which has a Mw of 19,500, is then sent to be pelletised.

The polycarbonate produced in this way displays a transmission of 87.7% at 400 nm in accordance with ASTM E 313. The integrated transmission across the entire wavelength range is 90.3%.

Example 2

Same as example 1, except that the melt temperature of the product in the extruder ranges from 235° C. when the polycarbonate solution enters the extruder to 275° C. when it leaves it.

The polycarbonate produced in this way displays a transmission of 87.9% at 400 nm in accordance with ASTM E 313. The integrated transmission across the entire wavelength range is 90.3%.

Comparative Example 1

Same as example 1, except that the melt temperature of the product in the extruder ranges from 245° C. when the polycarbonate solution enters the extruder to 295° C. when it leaves it.

The polycarbonate produced in this way displays a transmission of 85.2% at 400 nm in accordance with ASTM E 313. The integrated transmission across the entire wavelength range is 90.0%.

Comparative Example 2

Same as example 1, except that the melt temperature of the product in the extruder ranges from 265° C. when the polycarbonate solution enters the extruder to 320° C. when it leaves it.

The polycarbonate produced in this way displays a transmission of 83.2% at 400 nm in accordance with ASTM E 313. The integrated transmission across the entire wavelength range is 89.8%.

What is claimed is:

1. A method for the production and further processing of polycarbonate based on 1,1-bis(4-hydroxyphenyl)-3,3,5-trimethyl cyclohexane and 4,4-(metaphenylene diisopropyl) diphenol, comprising the steps of:

providing a composition comprising 1,1-bis(4-hydroxyphenyl)-3,3,5-trimethyl cyclohexane and 4,4-(metaphenylene diisopropy) diphenol;

reacting the composition using the phase boundary method to provide an organic polycarbonate phase; and filtering the organic polycarbonate phase at least two times; wherein the production and further processing of the polycarbonate is performed at temperatures of below 290° C.

2. The method according to claim 1, characterised in that the production and further processing of the polycarbonate is performed at temperatures of below 285° C.

3. A polycarbonate obtainable by the method defined in claim 1.

4. A polycarbonate based on 1,1-bis(4-hydroxyphenyl)-3,3,5-trimethyl cyclohexanone and 4,4-(metaphenylene diisopropyl) diphenol, characterised by a transmission of over 86% according to ASTM E 313 with a wayelength of 400 nm.

5. An optical data carrier comprising the polycarbonate defined in claim 4.

6. A method of making optical data carriers comprising providing a polycarbonate based on 1,1-bis(4-hydroxyphenyl)-3,3,5-trimethyl cyclohexanone and 4,4-(metaphenylene diisopropyl) diphenol, whereby the polycarbonate has a transmission of over 86% according to ASTM E 313 with a wavelength of 400 nm: and molding the polycarbonate into an optical data carrier.

7. The method according to claim 6, wherein the polycarbonate is moulded by a method selected from the group consisting of injection-compression moulding and injection moulding.

* * * * *